(12) United States Patent
Nakamura et al.

(10) Patent No.: US 7,251,212 B2
(45) Date of Patent: Jul. 31, 2007

(54) OPTICAL INFORMATION RECORDING MEDIUM

(75) Inventors: Yuki Nakamura, Tokyo (JP); Tohru Yashiro, Kanagawa-ken (JP); Tatsuo Mikami, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/410,853

(22) Filed: Apr. 26, 2006

(65) Prior Publication Data
US 2006/0204704 A1    Sep. 14, 2006

Related U.S. Application Data

(63) Continuation of application No. 11/082,866, filed on Mar. 18, 2005, now Pat. No. 7,095,706.

(30) Foreign Application Priority Data

| Mar. 19, 2004 | (JP) | ............................. 2004-081173 |
| Nov. 26, 2004 | (JP) | ............................. 2004-343159 |

(51) Int. Cl.
*G11B 7/24* (2006.01)
*B32B 3/02* (2006.01)

(52) U.S. Cl. .................. 369/288; 369/286; 369/94; 369/275.1; 428/64.4

(58) Field of Classification Search .. 369/275.1–275.5, 369/288, 286, 283, 94, 280, 277; 428/64.1, 428/64.5, 64.6, 64.7; 430/270.13; 720/718
See application file for complete search history.

(56) References Cited

U.S. PATENT DOCUMENTS 5,428,599 A  *  6/1995  Yashima et al. ............ 369/283
6,324,148 B1    11/2001  Kaneko et al.

(Continued)

FOREIGN PATENT DOCUMENTS

| EP | 1 229 528 | 8/2002 |
| EP | 1 496 509 | 1/2005 |
| EP | 1 496 509 A2 | 1/2005 |
| JP | 200030276 | 1/2000 |
| JP | 2000-311384 | 11/2000 |

OTHER PUBLICATIONS

Patent Abstracts of Japan, vol. 2000, No. 14, JP 2000 311384, published Nov. 7, 2000.
European Search Report dated Jun. 21, 2005.

*Primary Examiner*—Ali Neyzari
(74) *Attorney, Agent, or Firm*—Dickstein Shapiro LLP

(57) ABSTRACT

An optical information recording medium containing a first information substrate including a first substrate having a guide groove thereon, a first recording layer including a dye, overlying the first substrate and a first reflective layer being a semi-transmittance layer, overlying the first recording layer, a second information substrate comprising, a second substrate having a guide groove thereon, a second recording layer comprising a dye, overlying the second substrate, a second reflective layer being a semi-transmittance layer, located overlying the second recording layer and a light transmittance protective layer overlying the second reflective layer and a transparent intermediate layer. Further, the following relationships (1) and (2) are satisfied: (1) $0.3 \leq nd/\lambda \leq 0.7$, wherein n represents refractive index in the complex refractive index $n-ik$ of the light transmittance protective layer, d represents a thickness thereof, and $\lambda$ is at least one of a recording wavelength and a playback wavelength, (2) $k \leq 0.05$, wherein k represents absorption index of the light transmittance protective layer of the complex refractive index $n-ik$.

8 Claims, 4 Drawing Sheets

LASER BEAM

U.S. PATENT DOCUMENTS

| | | |
|---|---|---|
| 6,657,946 B2 | 12/2003 | Okubo |
| 6,716,507 B2 | 4/2004 | Tabata |
| 6,893,698 B2 | 5/2005 | Narumi et al. |
| 2002/0146875 A1 | 10/2002 | Yamagushi et al. |
| 2004/0076908 A1 | 4/2004 | Oomachi et al. |
| 2005/0013235 A1 | 1/2005 | Yashiro et al. |
| 2006/0174256 A1* | 8/2006 | Yashiro et al. .............. 720/718 |

* cited by examiner

OPTICAL INFORMATION RECORDING MEDIUM

CROSS-REFERENCE TO RELATED APPLICATIONS

This application is a continuation of application Ser. No. 11/082,866, filed Mar. 18, 2005 now U.S. Pat. No. 7,095,706, which is incorporated herein by reference in its entirety.

BACKGROUND OF THE INVENTION

1. Field of the Invention

The present invention relates to an information recording medium in which information is recorded and played back with irradiation of a laser beam and more particularly to a double-layer Digital Versatile Disc (DVD) having two write-once information recording layers.

2. Discussion of the Background

In addition to read-only optical information recording media such as DVD-ROMs, recordable Digital Versatile Discs (DVD) such as DVD+RWs, DVD+Rs, DVD-Rs, DVD-RWs and DVD-RAMs have been introduced into the market. DVD+Rs and DVD+RWs are technically positioned as an extension of conventional recordable compact discs such as CD-Rs and CD-RWs. To secure compatibility between DVD+Rs and DVD+RWs and read-only DVDs, the recording density (track pitch and signal mark length) and the thickness of the substrate of DVD+Rs and DVD+RWs are changed to DVDs from CDs. The structure of a DVD+R and a CD-R is similar in the following ways: a dye is spin-coated onto a substrate to provide an optical information recording layer; further, a metal reflective layer is provided to the backside of the optical information recording layer to form an information recording substrate; and furthermore, another similar information recording substrate is attached to the information recording substrate with an adhesive material. In this case, a dye material is used to form the optical information recording layer. CD-Rs are characteristic in having a high reflectivity (i.e., 65%) complying with the specification of CDs. To obtain such a high reflectivity for the structure mentioned above, it is required that the optical information recording (absorbing) layer satisfies a predetermined complex refractive index for its recording wavelength and/or playback wavelength. The optical absorption characteristics of such a dye material is suitable to satisfy the requirement mentioned above. This is true in the case of DVD+Rs.

To increase the recording capacity, a read-only DVD having double information recording layers having improved optical absorption and reflection is proposed. FIG. 1 is a cross section of a DVD of prior art having double information recording layers. A substrate 1 and a substrate 2 are attached with a transparent intermediate layer 5 therebetween. The transparent intermediate layer 5 is formed of an ultraviolet curing resin. On the inside of the substrate 1, convexoconcave layers are formed, including a semi-transmittance layer 3 functioning as a first information recording layer is provided. On the inside of the substrate 2, a reflection layer 4 is formed. The semi-transmittance layer 3 is formed of a dielectric film or a thin metal film. The reflective layer 4 also functions as a second information recording layer and is formed of a metal layer or the like.

Recording signals recorded in each information recording layer are played back by using the effects of reflection and interference of a playback laser beam. By reading signals from the two information recording layers, its storage capacity becomes approximately 8.5 GB at maximum. Each of the substrate 1 and the substrate 2 has a thickness of 0.6 mm. The transparent intermediate layer 5 has a thickness of approximately 50 μm. The semi-transmittance layer 3, i.e., the first information recording layer, is formed to have a reflectivity of approximately 30%. The laser beam irradiated to play back information recorded in the reflective layer 4, also functioning as the second information recording layer, is reflected at the semi-transmittance layer 3 and attenuated in an amount of approximately 30% of the entire laser beam. Thereafter the rest of the laser beam is reflected at the reflective layer 4 layer functioning as the second information recording layer and attenuated again at the semi-transmittance layer 3 and goes out of the disc. A playback laser beam is focused on the first information recording layer or the second information recording layer to playback signals therein by detecting its reflection light. The wavelength of the laser beam for use in recording and/or playback signals in a DVD is approximately 650 nm.

However, the recordable DVDs, i.e., DVD+Rs, DVD-Rs, DVD-RW, DVD+RWs, etc., of prior art have only a single information recording layer readable from one side. To increase a storage capacity thereof, it is necessary to develop a medium which can be read from both sides. When an optical pickup irradiates with a writing laser beam the information recording layer located at the back in an optical information recording medium in which information is recorded and read in double information recording layers from one side with its focus thereon, there is a problem in that the other information recording layer located at the front therein attenuates the power of the laser beam so that the medium does not have a good combination of optical absorption necessary to record information in the second information recording layer and optical reflection therefrom. Published unexamined Japanese Patent Application No. (hereinafter referred to as JOP) 11-66622 discloses an optical information recording medium having double information recording layers formed of an organic dye in which information can be written and read from one side. However, this medium has just a structure of two attached substrates. These attached substrates have a conventional structure of a substrate on the incident side and a conventional structure of a substrate on the recording layer side. Therefore, the medium does not solve the problem of optical absorption and reflection deriving from the second information recording-layer mentioned above. In addition, there is no description about drawbacks in a semi-transmittance layer when the layer is thin. JOP 10-340483 discloses an optical information recording medium containing a metal reflective layer, a dye-containing recording layer and a protective layer. The medium can use SiO and $SiO_2$ in the protective layer. However, there is no specific description about manufacturing conditions and optical characteristics. JOP 2000-311384 discloses an optical information recording medium having a second barrier layer between an intermediate layer (adhesive layer) and a second optical absorption layer. However, the literature describes only a single example in which Au is used as a material for the second barrier layer. When a metal is used as in this case, the absorption index k in the complex refractive index increases. As a result, it is impossible to fulfill the purpose of the present invention. Further, described in JOP 2000-311384, "absorption index k of a material for use in the second barrier layer is preferably not less than 0.1". Thus there is no known teaching of lowering the absorption index k to a level not greater than 0.05.

For the foregoing reasons, a need exists for an optical information recording medium having double information recording layers to have a large storage capacity in which information can be recorded and played back from one side with good signal characteristics even for the recording layer located further from the light-incident side.

SUMMARY OF THE INVENTION

An object of the present invention is to provide a one side recording and playback optical information medium having double information recording layers in which information can be recorded and played back with good signal characteristics even for the layer located furthest from the side of incident light. This object and other objects of the present invention will become more readily apparent and can be attained by an optical information recording medium containing a first information substrate including a first substrate having a guide groove thereon, a first recording layer containing a dye, located overlying the first substrate and a first reflective layer being a semi-transmittance layer, overlying the first recording layer, a second information substrate including a second substrate having a guide groove thereon, a second recording layer containing a dye, overlying the second substrate, a second reflective layer being a semi-transmittance layer, overlying the second recording layer, and a light transmittance protective layer located overlying the second reflective layer, and a transparent intermediate layer between the first and second information substrates. The first information substrate and the second information substrate are attached to each other by an intermediary of the transparent intermediate layer with the first substrate and the second substrate outside. Further, the following relationships (1) and (2) are satisfied: (1) $0.3 \leq nd/\lambda \leq 0.7$, wherein n represents refractive index in a complex refractive index n-ik of the light transmittance protective layer, d represents a thickness of the light transmittance protective layer, and $\lambda$ is at least one of a recording wavelength and a playback wavelength, and; (2) $k \leq 0.05$, wherein k represents absorption index of the light transmittance protective layer of the complex refractive index n-ik.

It is preferred that the optical information recording medium satisfies the following relationship: $0.4 \leq nd/\lambda \leq 0.6$.

It is still further preferred that, in the optical information recording medium, the refractive index of the light transmittance protective layer is from 1.9 to 2.5 and the thickness thereof is from 90 to 210 nm.

It is still further preferred that, in the optical information recording medium, when a complex refractive index of the second recording layer is n-iK for at least one of the recording wavelength and the reading wavelength, wherein n represents a refractive index of the second recording layer and k is an absorption index thereof, the refractive index n is from 2.2 to 2.8 and the absorption index k is from 0.03 to 0.07.

It is still further preferred that, in the optical information recording medium, the light transmittance protective layer contains ZnS as its main component and a transparent electrocondcutive oxide.

It is still further preferred that, in the optical information recording medium, the transparent electrocondcutive oxide is at least one of $In_2O_3$, ZnO and $Ga_2O_3$.

It is still further preferred that, in the optical information recording medium, the ratio of ZnS contained in the light transmittance protective layer based on an entire material contained therein is 50/100 to 93/100 by mol.

It is still further preferred that, in the optical information recording medium, the light transmittance protective layer comprises multiple layers having different refractive indices.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as they become better understood from the detailed description when considered in connection with the accompanying drawings in which like reference characters designate like corresponding parts throughout and wherein.

DETAILED DESCRIPTION OF THE INVENTION

Figure 1:
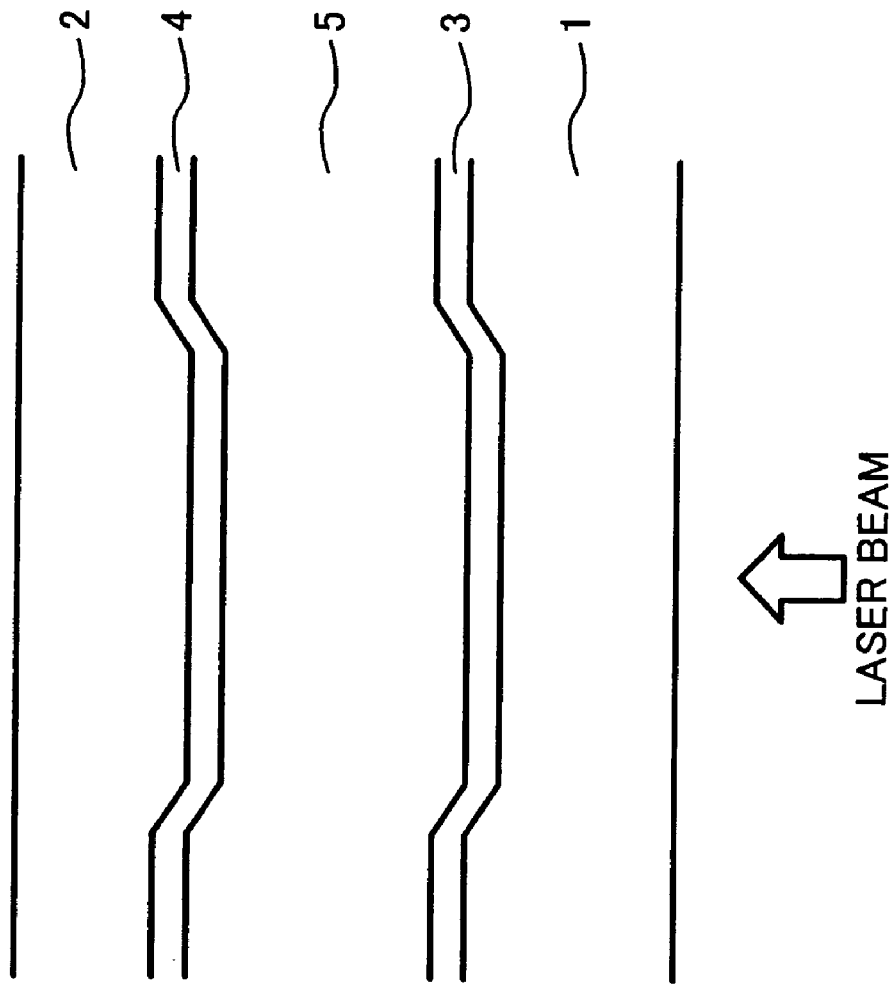
FIG. 1 is a cross section illustrating the structure of a DVD of prior art having double information recording layers.
Figure 2:
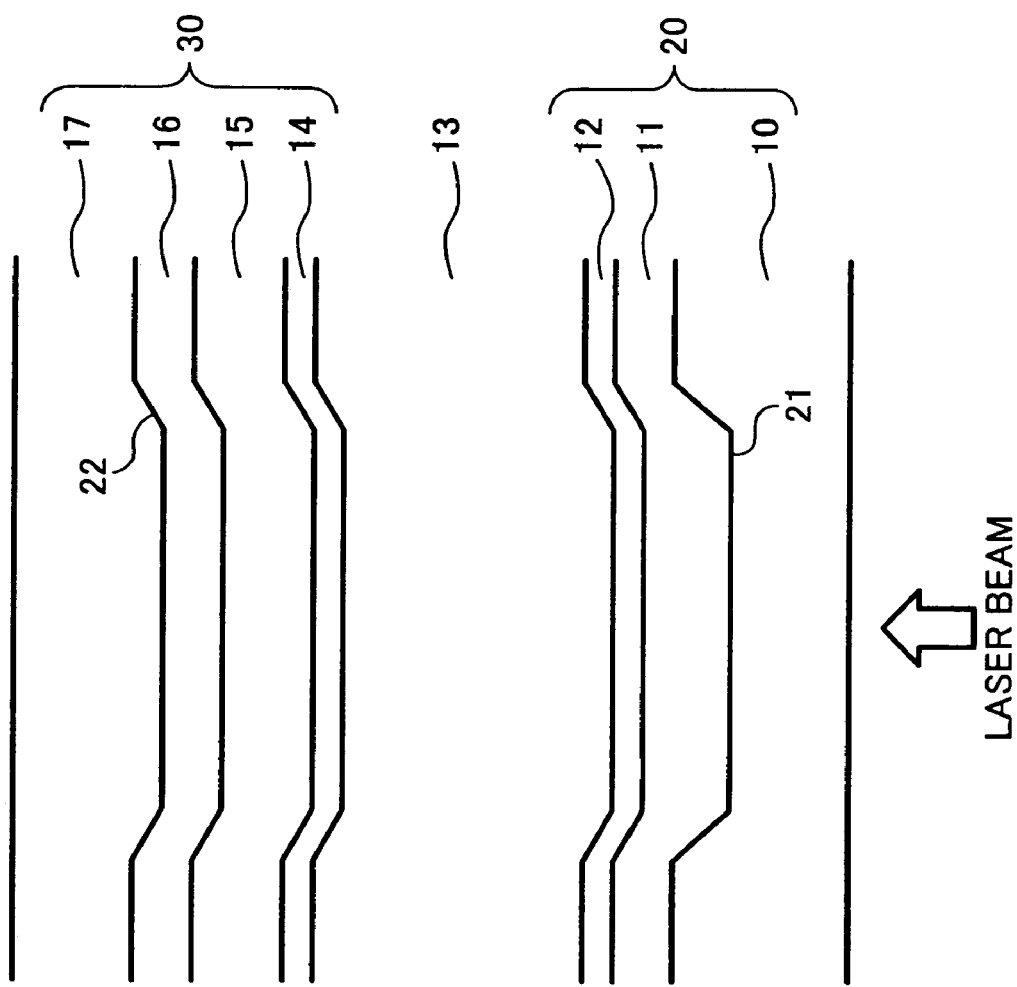
FIG. 2 is a diagram illustrating an example of the structure of the optical information recording medium of the present invention.

The present invention will be described below in detail with reference to several embodiments and accompanying drawings. FIG. 2 is a diagram illustrating an embodiment of a structure of the optical information recording medium of the present invention. The optical information recording medium contains a first information substrate 20 and a second information substrate 30. The first information substrate 20 contains a first substrate 10 having a guide groove 21 thereon on which at least a first recording layer 11 formed of a dye and a first reflective layer 12 (a semi-transmittance layer) are provided in this order. The second information substrate 30 contains a second substrate 17 having a guide groove 22 thereon on which at least a second reflective layer 16, a second recording layer 15 formed of a dye and a light transmittance protective layer 14 are provided in this order. The first information substrate 20 and the second information substrate 30 are attached to each other with a transparent intermediate layer 13 (adhesive layer) therebetween with the recording layers 11, 15 inside.

The first information substrate 20 has a structure containing a first substrate 11, a first recording layer 12 and a first reflective layer 13. This is the same as the structure of a conventional medium having a single recording layer such as DVD+R and DVD-R except that the conventional medium has a second substrate on the first information substrate. Reflectivity and recording signal modulation depth (contrast) can be obtained through a multiple interference effect at both interfaces of the first recording layer 11 and transformation of the first substrate 10 caused by mark formation. For the second information substrate 30 requiring reflectivity and recording signal modulation depth (contrast) can be obtained through the form of its guide groove 22 and optical absorption characteristics of the dye. In addition, by providing the light transmittance protective layer 14 formed of an inflexible material between the second recording layer 15 and the transparent intermediate layer 13 formed of organic resins, etc., it is possible to prevent the dye from flowing out due to the presence of the organic resin and to adjust the form of marks.

In the present invention, it is preferred that the thickness of the second recording layer 15 is 1.5 to 2.5 times as thick as that of the first recording layer 11. When the difference in both thicknesses is out of this preferred range, it is difficult to record information in both layers 11, 15 with the same strategy (light emission pulse patterns of a recording laser beam) because recording marks spread differently on both layers 11, 15. With regard to dye films, typically an application solvent in which a dye is dissolved is spin-coated. When such a dye solvent is applied to a substrate having a guide groove, the thickness of the dye applied to a groove portion and a portion between grooves is different. In addition, the groove forms formed on the first substrate and the second substrate are different. It is preferred that a 4.7 GB DVD+R or DVD-R having a 0.74 µm pitch has a groove depth of from 100 to 200 nm and a groove width (at its bottom) of from 0.2 to 0.3 µm. When a spin coating method is used, a dye tends to be filled in the groove. Forms formed at the interface between the dye recording layer and the reflective layer are determined by the amount of the dye filled and the groove form of the substrate. Therefore, when reflection at the interface therebetween is utilized, the range mentioned above is suitable.

By contrast, the groove form 22 of the second substrate 17 preferably has a depth of from 20 to 60 nm and a groove width of from 0.2 to 0.4 µm. As illustrated in FIG. 2, since the interface form formed between the dye recording layer 15 and the reflective layer 16 is determined by the groove form of the substrate, the range mentioned above is suitable to utilize the reflection at the interface. When the groove depth of the first substrate 10 and the second substrate 17 is relatively deep in comparison to the range mentioned above, the reflectivity easily decreases. In addition, when the groove depth is relatively shallow in comparison to the range mentioned above or the groove width is out thereof, tracking is unstable during recording and recording marks formed tend to vary so that jitter tends to increase.

The first recording layer 11 at the groove portions and the second recording layer 15 at the portions between grooves preferably have a thickness of from 40 to 100 nm and from 60 to 200 µm, respectively. When the thickness of the recording layer is relatively thin in comparison with the range mentioned above, signal modulation depth (contrast) is difficult to obtain. When the thickness of the recording layer is relatively thick in comparison with the range mentioned above, the marks formed tend to have different forms so that jitters easily increase.

Next, the materials for use in each layer of the optical information recording medium of the present invention will be described.

The optical information recording medium of the present invention has a structure in which a high reflectivity can be obtained by multiple interference effect at both interfaces of a recording layer containing a dye as in the case of a DVD+R and a CD-R. The recording layer containing a dye is necessary to have optical characteristics such that the refractive index n and the absorption index k in the complex refractive index n-ik are large and relatively small, respectively, for a recording wavelength and/or playback wavelength λ (nm). The refractive index n is greater than 2 and preferably from 2.2 to 2.8. The absorption index k is from 0.02 to 0.2 and preferably from 0.03 to 0.07. When the absorption index k is too small, the sensitivity of the recording layer tends to deteriorate because the absorption of a recording laser beam thereat is not good. When the absorption index k is too large, the reflectivity at the recording layer tends to deteriorate so that it is difficult to obtain sufficient reflectivity at the recording layer located furthest from the light incident side when the medium is a double recording layer type. Such suitable optical characteristics are obtained by utilizing characteristics at the end portion on the long wavelength side in optical absorption band of the dye layer. The optical information recording medium of the present invention is for a red laser beam having a wavelength of from 600 to 800 nm and preferred writing and/or reading wavelength λ of from 650 to 670 nm. When designing a medium, the wavelength of a writing and/or reading laser beam is determined to be in the range mentioned above and then materials for and the thickness of each layer are selected under the conditions of the present invention.

Specific examples of dye materials for use in the first and second recording layers include cyanine dyes, phthalocyanine dyes, pyrylium/thiopyrylium dyes, azulenium dyes, squarilium dyes, azo dyes, formazane chleate dyes, metal complex dyes (e.g., Ni and Cr), naphthoquinone/anthraquinone dyes, indophenol dyes, indoaniline dyes, triphenyl methane dyes, triallyl methane dyes, aminium/diinmonium dyes and nitroso dyes. Among these, considering the dye layer forming property and adjusting property of optical characteristics, tetraazaporphyrin dyes, cyanine dyes, azo dyes and squarilium dyes are preferred as dyes which have a maximum absorption wavelength of optical absorption spectrum of from 580 to 620 nm and which can easily obtain predetermined optical characteristics for a laser beam wavelength for DVD, i.e., approximately 650 nm. In addition, such a recording layer can be formed of a dye alone or a combination of a dye and other components such as a binder and a stabilizer.

Any substrate for use in conventional information recording media can be used as the substrate of the present invention. Specific examples of materials for use in the substrate of the present invention include acrylic resins such as polymethylmethacrylate, vinyl chloride resins such as polyvinyl chloride resins and vinyl chloride copolymers, epoxy resins, polycarbonate resins, amorphous polyolefin resins, polyester resins and glass and ceramics such as soda lime glass. Among these, in terms of dimension stability, transparency and planarity, polymethyl methacrylate resins, polycarbonate resins, epoxy resins, amorphous polyolefin resins, polyester resins and glass are preferred. Further, polycarbonate resins are most preferred in terms of processability.

Materials having a high reflectivity for a laser beam wavelength are preferred for the first reflective layers (semitransmittance layer). Preferred specific examples of materials therefor include metals and half metals such as Au, Ag, Cu, Al, Ti, V, Cr, Ni, Nd, Mg, PD, Zr, Pt, Ta, W, Si and Zn. Among these, it is preferred to use an alloy mainly formed of one of Au, Ag, Cu and Al to which at least one of Au, Ag, Cu, Al, Ti, V, Cr, Ni, Nd, Mg, PD, Zr, Pt, Ta, W, Si and Zn other than the metal selected as the main component is added in an amount of 1 to 10% by weight. By adding such a metal in an amount of at least 1% by weight to form such an alloy, crystalline particles thereof are finely minute so that a thin film having excellent corrosion resistance can be obtained.

Too large an additional amount is not preferred because the reflectivity at the reflective layer decreases.

The first reflective layer preferably has a thickness of from 5 to 30 nm. When a recording layer containing a dye and a transparent intermediate layer formed of an acrylic resin, etc., is in contact with an extremely thin first reflective layer having a thickness of 30 nm, it is necessary to prevent the dye and the acrylic resin from moving through the reflective layer and reacting with each other. When a reflective layer is formed of an unalloyed metal thin layer containing crystal having a large particle diameter, such a thin layer tends to be island-shaped and the acrylic resin easily infiltrates from the grain boundary.

A light transmittance protective layer 14 is provided between the second recording layer 15 and the transparent intermediate layer 13 to chemically and physically protect the recording layer 15 containing a dye. Specific examples of materials for use in such a light transmittance protective layer 14 include oxides such as $SiO_x$ (x is 1 or 2), $In_2O_3$, $SnO_2$, $ZNO$, $Ga_2O_3$, $Al_2O_3$, $MgO$, $TiO_2$, $Ta_2O_5$, half metals or semiconductors such as Si, Ge, Sic, Tic and graphite, fluorides such as $MgF_2$, $AlF_3$, $LaF_3$ and $CeF_3$, sulfides such as ZnS, CdS and $Sb_2S_3$, nitrides such as $Si_3N_4$ and AlN, ZnSe, GaSe, ZnTe and their combinations. Among these, materials containing a large amount of compounds having a small internal stress such as ZnS, CdS, ZnSe, ZnTe, $Sb_2S_3$ and $SiO_x$ are preferred. Further, to optimize the refractive index n and the absorption index k, mixtures of these compounds can be used. These materials have a high melting point. When materials do not react with each other during sintering of a target, the refractive index n and the absorption index k are almost equal to the weighted mean of their mixture ratio.

Especially, ZnS is suitable to improve productivity and to reduce cost because ZnS is less toxic and less expensive and has a high sputtering rate. The mixture ratio of ZnS is preferably from 50 to 93 mol % and more preferably from 70 to 91 mol %. When the mixture ratio of ZnS is too high, a thin layer is not formed well on the second recording layer containing a dye. To adjust the refractive ratio n, the mixture ratio of ZnS is determined to be not greater than 93 mol % and preferably not greater than 91 mol %. In addition, it is good to mix ZnS with a material having a different refractive index. Too low a mixture ratio of ZnS is not preferred because one of the good characteristics of ZnS, i.e., high sputtering rate, is degraded. When a thin layer of a mixture is formed, it is possible to sputter plural targets simultaneously. However, this is not preferred because equipment cost rises and controlling the mixing ratio is difficult. Therefore, it is advantageous in terms of productivity to manufacture a mixture of ZnS and additives before sputtering. The refractive index of ZnS is approximately 2.35. To decrease the refractive index, ZnS is mixed with $SiO_2$. Such a mixture can be used for a target for CD-RWs, DVD-RWs and DVD+RWs currently in the market so that the quality of obtained media is stable.

In addition, it is possible to increase the refractive index of ZnS by adding, for example, Si (n-ik=4.2-i0.3), SiC (n-ik=7-i0.1), SiO (n-ik=1.95-i0), $SiO_2$ (n-ik=1.46-i0), $SiO_x$ (x is 1 or 2) (n-ik=1.46 to 1.95-i0), $TiO_2$ (n-ik=2.6-i0) or Ge (n-ik=5.3-i0.5) in an amount not less than 5 mol %. When the addition ratio is too small, the effect of increasing the refractive index n is ignorably small.

It is possible to add Si in an amount of 30 mol % at maximum so that the refractive index n can be raised up to approximately 3.2. When Si is added too much, the absorption index k becomes too large. This is not preferred because the reflectivity decreases. It is possible to raise the refractive index n to approximately 2.5 by adding SiC in an amount of 40 mol % at maximum. When too much SiC is added, the stress increases so that the recording layer and the light transmittance protective layer detach at their interface. In addition, electroconductivity can be added to a target by adding a transparent electroconductive oxide such as $In_2O_3$, $SnO_2$, ZnO, $Ga_2O_3$ and $Nb_2O_3$ or an oxide in which an element such as Al, Ga, In, Sn, Nb, Zn, Ta, F and Sb is doped to the transparent electroconductive oxide. Thereby, DC sputtering is possible. That is, the sputtering rate increases. This contributes to shortening of the production takt time and cost reduction of production equipment. To use DC sputtering, a target is necessary to have a specific resistance not greater than 1 Ωcm, preferably not greater than 0.1 Ωcm to prevent a problem such as arc even when a sputtering power is high, and more preferably not greater than 0.01 Ωcm to unnecessitate an arc cut device or pulse overlapping device to a sputtering power source, resulting in cost reduction of production equipment. When the SiC addition amount is too much, the stress of a film layer increases and thus the recording layer and the light transmittance protective layer detach at their interface. Therefore, the SiC addition amount is limited to 50 mol % at maximum.

Further, it is possible to provide double light transmittance protective layers to secure cohesiveness of a recording layer and a light transmittance protective layer. A first transparent protective layer, which is soft and contains ZnS in a relatively large amount, is provided on a dye recording layer and a second transparent protective layer, which is hard and contains ZnS in a relatively small amount, is provided on the first transparent protective layer to prevent deformation of the dye recording layer caused by recording. Thereby, crosstalk between adjacent tracks can be restrained.

The layer thickness of a light transmittance protective layer is preferably from 10 to 300 nm, more preferably from 90 to 210 nm and further more preferably from 95 to 200 nm. When the layer thickness is too thin, materials in the transparent intermediate layer infiltrates into the second recording layer through defective portions in the light transmittance protective layer, resulting in deterioration of the dye in the recording layer. When the layer thickness is too thick, the temperaure of a substrate during sputtering greatly rises, resulting in an increase in the layer stress. Therefore, the substrate tends to deform and the light transmittance protective layer easily detaches. In addition, when the absorption index k is not zero, the reflectivity at the reflective layer decreases by absorption.

As illustrated in FIGS. 3 to 6 described later, by determining nd/λ from 0.3 to 0.7, jitter can be limited to not greater than 11%, which is not a problematic level when information is recorded or played back by a DVD player. In addition, by determining nd/λ from 0.4 to 0.6, a medium can have a reflectivity not less than 15%, a modulation depth not less than 0.6 and a jitter not greater than 10% so that playback compatibility thereof can be improved. Further, the absorption index k can be determined to be not greater than 0.05 so that it is possible to have a reflectivity not less than 11%, which does not cause a practical problem.

Therefore, the absorption index k is determined to be not greater than 0.05 and nd/λ is determined to be from 0.3 to 0.7, preferably from 0.4 to 0.6 and, more preferably from 0.4 to 0.5, wherein λ represents recording wavelength and/or playback wavelength for a light transmittance protective layer and wherein n and k in the complex refractive index n-ik represent refractive index and absorption index, respectively, and d represents layer thickness of the light transmittance protective layer.

The relationships among the complex refractive index, the layer thickness and the reflectivity of a second recording layer are as follows.

(1) The reflectivity does not fluctuate when the refractive index n of the second recording layer is changed but the frequency of the reflectivity change is short when the thickness of the light transmittance protective layer is changed;

(2) As the layer thickness of the second recording layer increases, the reflectivity decreases. The frequency of the reflectivity change is short when the thickness of the light transmittance protective layer is changed; and (3) The reflectivity decreases when the absorption index k of the second recording layer is changed but the frequency of the reflectivity change does not change when the thickness of the light transmittance protective layer is changed.

The same material as mentioned for a first reflective layer can be used for a second reflective layer. The thickness of a second reflective layer is approximately 120 to 160 nm.

It is preferred that a transparent intermediate layer also functions as an adhesive layer. Specific examples of materials for such a transparent intermediate layer include conventional acrylate, epoxy and urethane ultraviolet curing resin or thermosetting adhesive agents. In addition, a transparent sheet can be used as an adhesive layer. The thickness of a transparent intermediate layer is from 40 to 70 μm and preferably from 50 to 60 μm.

In addition, acrylic or epoxy ultraviolet curing resins, etc., can be inserted between a light transmittance protective layer and a transparent intermediate layer to protect the layers chemically or physically.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Examples 1 to 4

A coating liquid in which a squarilium dye compound represented by the following chemical formula 1 was dissolved in 2,2,3,3-tetrafluoropropanol was coated on a polycarbonate substrate (first substrate) having the following dimension to form a first recording layer.

Dimension of the polycarbonate substrate:

| diameter | 120 mm |
| thickness | 0.58 mm |

Guide groove having convexocancave patterns on the polycarbonate substrate

| depth | 140 nm |
| width | 0.25 μm |
| track pitch | 0.74 μm |

The maximum absorption wavelength of this recording layer was 609 nm and the absorption level was 0.6 at the maximum absorption wavelength. On the first recording layer, a first reflective layer having a thickness of 9 nm formed of $Ag_{99.5}In_{0.5}$ was formed under the following conditions:

Sputtering device: BIGSPRINTER (manufactured by Unaxis Co. Ltd.)

Sputtering gas: Ar

Sputtering pressure: $6.0 \times 10^{-3}$ torr

Sputtering power: 3.5 kW

A second reflective layer having a thickness of approximately 120 nm formed of $Ag_{98}Cu_2$ was formed on a second substrate having the following dimensions using BIGSPRINTER (manufactured by Unaxis Co. Ltd.) as a sputtering device and Ar as a sputtering gas:

Dimension of the second polycarbonate substrate:

| diameter | 120 mm |
| thickness | 0.60 mm |

Guide groove having convexocancave patterns on the second polycarbonate substrate

| depth | 40 nm |
| width | 0.25 μm |
| track pitch | 0.74 μm |

Next, a squarilium dye compound represented by the following chemical formula 1 was spin-coated on the second reflective layer to form a second recording layer having a thickness such that absorption level of the second recording layer is 1.1. Further, $GeS_2$ was sputtered using Ar as a sputtering gas to form a light transmittance protective layer having a thickness of 110 nm (Example 1), 130 nm (Example 2), 140 nm (Example 3) and 150 nm (Example 4).

The first substrate and the second substrate on which the recording and reflective layers were formed were attached to each other with an ultraviolet curing adhesive agent (KARAYAD DVD576M manufactured by Nippon Kayaku Co., Ltd.) functioning as a transparent intermediate layer to obtain an optical information recording medium having a structure illustrated in FIG. 2.

Chemical formula 1

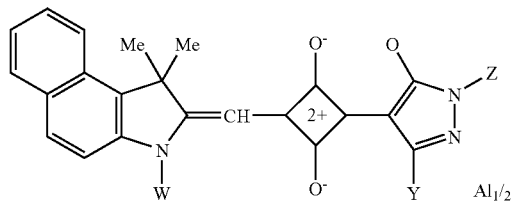

W : Me (methyl group)
Y : $CF_3$
Z : Ph (phenyl group)

Examples 5 to 19

Optical information recording media for Examples 5 to 19 were obtained in the same manner as described in Example 1 except that materials and the thickness of the light transmittance protective layer were changed as shown in Table 1.

The optical information recording media of Examples 1 to 19 were evaluated using a DVD evaluation device (DDU1000 manufactured by Pulstec Industrial Co., Ltd.) with a wavelength of 657 nm and numerical aperture NA of 0.65 in the following way: Record DVD (8 to 16) signals with an optimal recording power Po (mW) (i.e., the recording power at which data to data clock jitter was minimum) at a linear velocity of 9.2 m/s; and evaluate playback performance at a linear velocity of 3.8 m/s. The results are shown in FIGS. 3 to 6. The recording pulse strategy was a multiple pulse system of (n−2)T with a multiple pulse width of 10/16.

Figure 3:
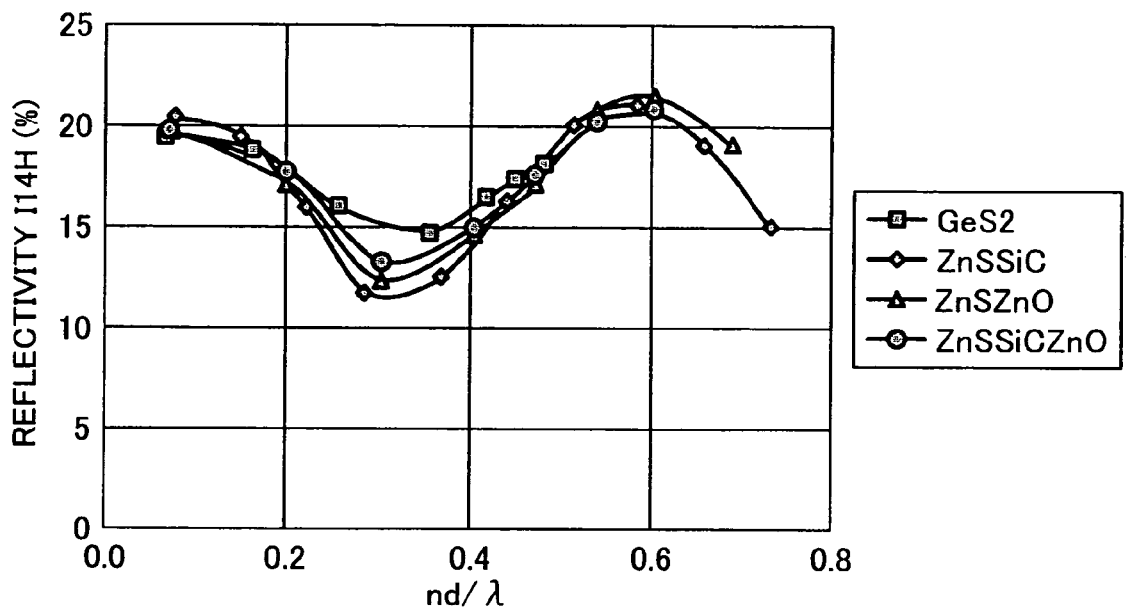
FIG. 3 is a graph illustrating the relationship between nd/$\lambda$ and the reflectivity I14H.
Figure 4:
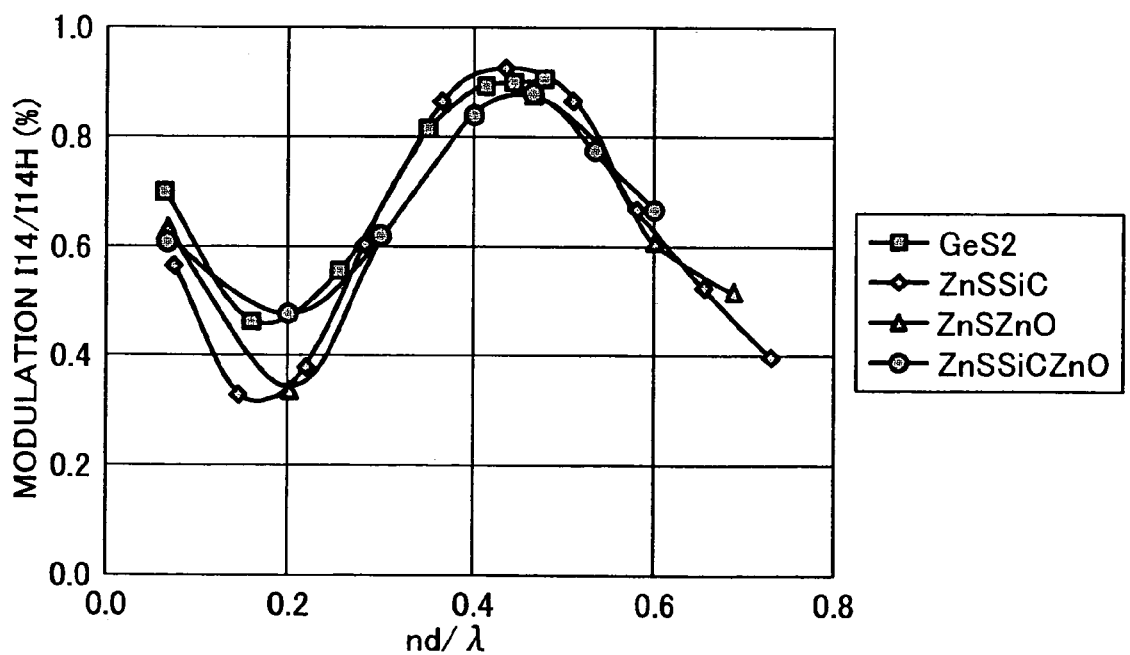
FIG. 4 is a graph illustrating the relationship between nd/$\lambda$ and the modulation depth I14/I14H.
Figure 5:
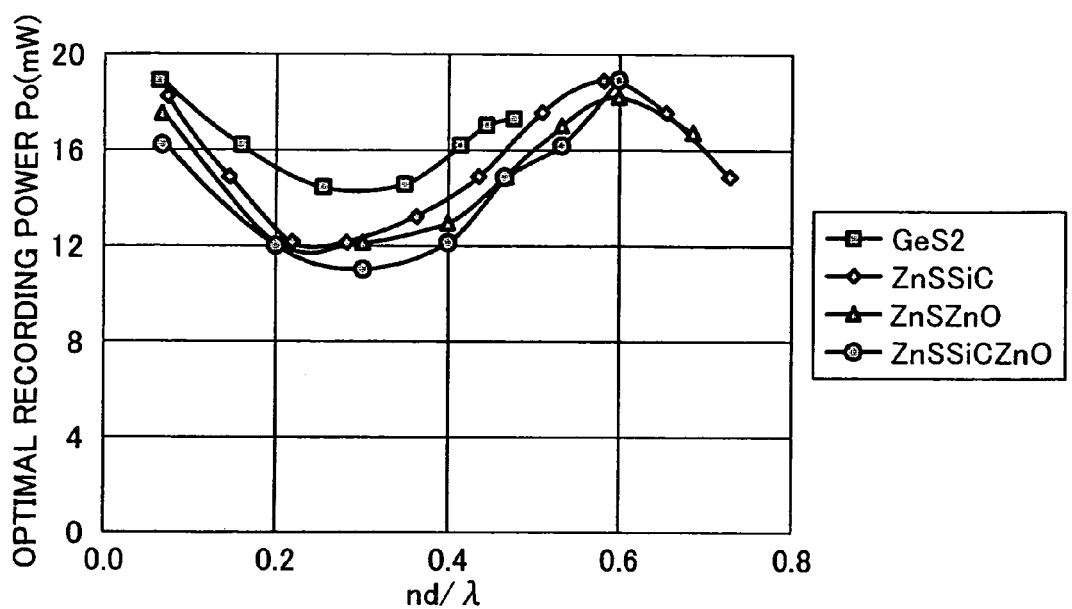
FIG. 5 is a graph illustrating the relationship between nd/$\lambda$ and the optimal recording power Po (mW)
Figure 6:
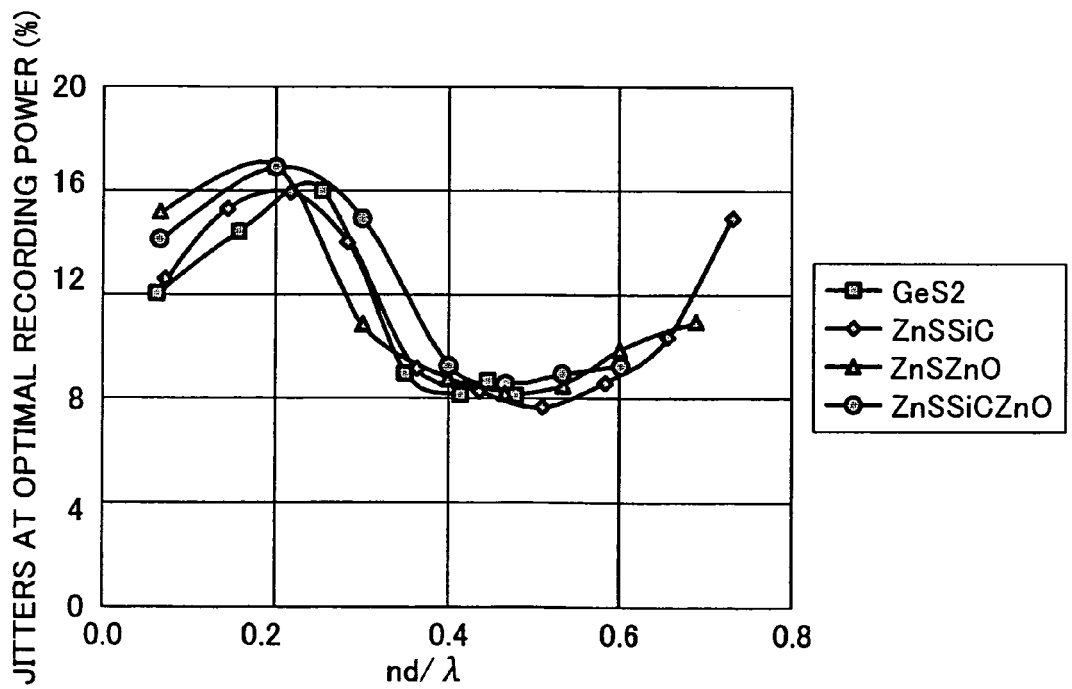
FIG. 6 is a graph illustrating the relationship between nd/$\lambda$ and the jitter at the optimal recording power Po (mW).

As seen in FIG. 3, when a refractive index was large, the reflectivity after recording I14H (%) varies in a cyclic manner against nd/λ and was high when nd/λ was not greater than 0.25 and was from 0.4 to 0.7. As seen in FIG. 4, 14T modulation depth, i.e., ratio of reflectivity I14 to reflectivity after recording I14H, was high when nd/λ was not greater than 0.07 and was from 0.3 to 0.6. In addition, as seen in FIG. 6, the jitter at the optimal recording power was not greater than 10% when nd/λ was from 0.35 to 0.6. When nd/λ was from 0.3 to 0.7, the jitter was not greater than 11% so that there was no unacceptable error. When nd/λ was from 0.4 to 0.6, the jitter was not greater than 10%, meaning that problems such as decrease in playback velocity did not occur even when a DVD-ROM drive or DVD-Video in the market was used for playback. In addition, it was possible to adjust the reflectivity after recording at a second recording layer by changing the thickness of a first reflective layer without affecting modulation depth and jitter.

Examples 20 to 26

Optical information recording media for Examples 20 to 26 were obtained in the same manner as described in Example 1 except that materials and the thickness of the light transmittance protective layer were changed as shown in Table 1. The recording characteristics were measured in the same manner as in Example 1. The results are shown in Table 1.

As seen in Table 1, reflectivity I14 (%) at the optimal recording power, modulation depth I14/I14H (%) and jitter (%) were excellent in Examples 20 to 26.

TABLE 1

| | Light trasnmittance protective layer (composition ratio in mol %) | Sputter power source | Refractive index | Absorption index | Layer thickness | nd/λ | Reflectivity I14H(%) | Modulation depth (I14/I14H) (%) | Jitter (%) | Po (Mw) |
|---|---|---|---|---|---|---|---|---|---|---|
| Ex. 1 | GeS$_2$ | RF | 2.13 | 0.001 | 110 | 0.35 | 15 | 0.81 | 9.0 | 15 |
| Ex. 2 | GeS2 | RF | 2.13 | 0.001 | 130 | 0.41 | 17 | 0.89 | 8.2 | 16 |
| Ex. 3 | GeS$_2$ | RF | 2.13 | 0.001 | 140 | 0.45 | 17 | 0.90 | 8.7 | 17 |
| Ex. 4 | GeS$_2$ | RF | 2.13 | 0.001 | 150 | 0.48 | 18 | 0.91 | 8.2 | 17 |
| Ex. 5 | ZnS(80)SiC(20) | RF | 2.38 | 0.01 | 100 | 0.36 | 13 | 0.86 | 9.2 | 13 |
| Ex. 6 | ZnS(80)SiC(20) | RF | 2.38 | 0.01 | 120 | 0.44 | 16 | 0.93 | 8.3 | 15 |
| Ex. 7 | ZnS(80)SiC(20) | RF | 2.38 | 0.01 | 140 | 0.51 | 20 | 0.87 | 7.7 | 18 |
| Ex. 8 | ZnS(80)SiC(20) | RF | 2.38 | 0.01 | 160 | 0.58 | 21 | 0.67 | 8.6 | 19 |
| Ex. 9 | ZnS(80)SiC(20) | RF | 2.38 | 0.01 | 180 | 0.66 | 19 | 0.53 | 10.4 | 18 |
| Ex. 10 | ZnS(80)ZnO(20) | DC | 2.21 | 0.01 | 90 | 0.30 | 13 | 0.62 | 10.9 | 12 |
| Ex. 11 | ZnS(80)ZnO(20) | DC | 2.21 | 0.01 | 120 | 0.40 | 15 | 0.84 | 8.8 | 13 |
| Ex. 12 | ZnS(80)ZnO(20) | DC | 2.21 | 0.01 | 140 | 0.47 | 17 | 0.88 | 8.3 | 15 |
| Ex. 13 | ZnS(80)ZnO(20) | DC | 2.21 | 0.01 | 160 | 0.53 | 21 | 0.79 | 8.6 | 17 |
| Ex. 14 | ZnS(80)ZnO(20) | DC | 2.21 | 0.01 | 180 | 0.60 | 21 | 0.61 | 9.9 | 18 |
| Ex. 15 | ZnS(80)ZnO(20) | DC | 2.21 | 0.01 | 206 | 0.69 | 19 | 0.52 | 10.8 | 17 |
| Ex. 16 | ZnS(75)SiC(15)ZnO(10) | DC | 2.25 | 0.04 | 120 | 0.40 | 15 | 0.84 | 9.3 | 12 |
| Ex. 17 | ZnS(75)SiC(15)ZnO(10) | DC | 2.25 | 0.04 | 140 | 0.47 | 18 | 0.88 | 8.6 | 15 |
| Ex. 18 | ZnS(75)SiC(15)ZnO(10) | DC | 2.25 | 0.04 | 160 | 0.53 | 20 | 0.78 | 9.0 | 16 |
| Ex. 19 | ZnS(75)SiC(15)ZnO(10) | DC | 2.25 | 0.04 | 180 | 0.60 | 21 | 0.67 | 9.3 | 19 |
| Ex. 20 | ZnS(60)SiO$_2$(40) | RF | 1.9 | 0.005 | 200 | 0.58 | 21 | 0.67 | 9.6 | 19 |
| Ex. 21 | ZnS(91)ZnO(7)In$_2$O$_3$(2) | DC | 2.25 | 0.001 | 140 | 0.48 | 18 | 0.84 | 8.3 | 18 |
| Ex. 22 | ZnS(93)ZnO(6)Ga$_2$O$_3$(1) | DC | 2.25 | 0.001 | 140 | 0.48 | 18 | 0.83 | 8.2 | 17 |
| Ex. 23 | ZnS(60)ZnO(40) | DC | 2.1 | 0.005 | 120 | 0.38 | 14 | 0.78 | 8.5 | 14 |
| Ex. 24 | ZnS(50)ZnO(50) | DC | 2.05 | 0.01 | 120 | 0.37 | 13 | 0.75 | 8.8 | 14 |
| Ex. 25 | ZnS(70)TiC(10)Nb$_2$O$_5$(20) | DC | 2.5 | 0.05 | 95 | 0.36 | 11 | 0.62 | 10.0 | 14 |
| Ex. 26 | SnO$_2$(70)Ta$_2$O$_5$(30) | DC | 2.0 | 0.02 | 160 | 0.49 | 19 | 0.78 | 8.3 | 18 |

This document claims priority and contains subject matter related to Japanese Patent Applications Nos. 2004-081173 and 2004-343159, filed on Mar. 19, 2004, and Nov. 26, 2004, respectively, incorporated herein by reference.

Having now fully described the invention, it will be apparent to one of ordinary skill in the art that many changes and modifications can be made thereto without departing from the spirit and scope of the invention as set forth therein.

What is claimed is:

1. An optical information recording medium comprising:
    a first information substrate comprising:
        a first substrate having a guide groove thereon;
        a first recording layer comprising a dye, overlying the first substrate; and
        a first reflective layer being a semi-transmittance layer located overlying the first recording layer;
    a second information substrate comprising:
        a second substrate having a guide groove thereon;
        a second reflective layer, located overlying the second substrate;
        a second recording layer comprising a dye, located overlying the second reflective layer; and a light transmittance protective layer located overlying the second recording layer; and a transparent intermediate layer, wherein the first information substrate and the second information substrate are attached to each other by an intermediary of the transparent intermediate layer with the first substrate and the second substrate outside and wherein the following relationships (1) and (2) are satisfied:

(1) $0.3 \leq nd/\lambda \leq 0.7$, wherein n represents a refractive index of the light transmittance protective layer, d represents a thickness of the light transmittance protective layer, and $\lambda$ is at least one of a recording wavelength and a playback wavelength;

(2) $k \leq 0.07$, wherein k represents an absorption index of the light transmittance protective layer of the complex refractive index n-ik.

2. The optical information recording medium according to claim 1, wherein, the following relationship is satisfied: $04. \leq nd/\lambda \leq 0.6$.

3. The optical information recording medium according to claim 2, wherein the refractive index of the light transmittance protective layer is from 1.9 to 2.5 and the thickness thereof is from 90 to 210 nm.

4. The optical information recording medium according to claim 1, wherein, when a complex refractive index of the second recording layer is n-iK for at least one of the recording wavelength and the reading wavelength, wherein n represents a refractive index of the second recording layer and k is an absorption index thereof, the refractive index n is from 2.2 to 2.8 and the absorption index k is from 0.03 to 0.07.

5. The optical information recording medium according to claim 1, wherein the light transmittance protective layer contains ZnS as its main component and a transparent electroconductive oxide.

6. The optical information recording medium according to claim 5, wherein a ratio of ZnS contained in the light transmittance protective layer based on an entire material contained therein is 50/100 to 93/100 by mol.

7. The optical information recording medium according to claim 5, wherein the transparent electroconductive oxide is at least one of $In_2O_3$, $ZnO$ and $Ga_2O_3$.

8. The optical information recording medium according to claim 1, wherein the light transmittance protective layer comprises multiple layers having different refractive indices.

* * * * *